Jan. 3, 1967  J. A. BUS ETAL  3,295,260
SEALING ELEMENT
Filed Oct. 23, 1965  2 Sheets-Sheet 1
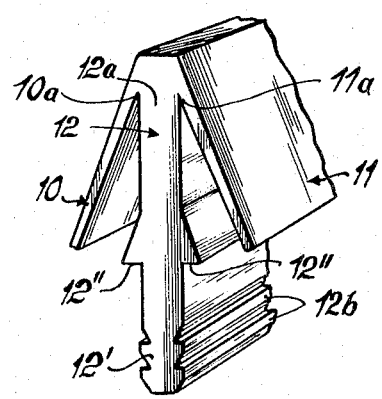
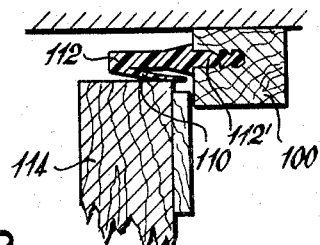
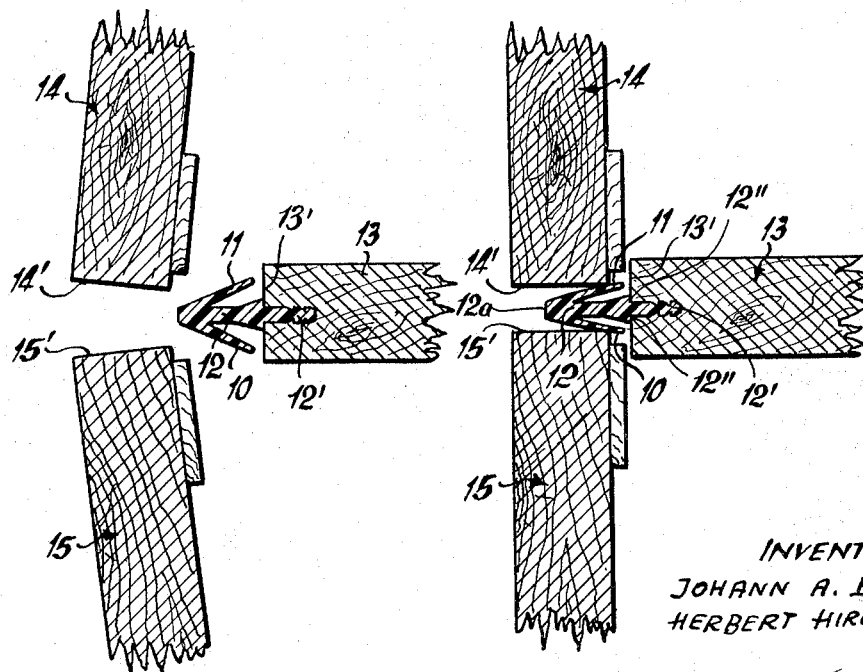
INVENTORS:
JOHANN A. BUS
HERBERT HIRCHE
BY Michael S. Striker
their ATTORNEY

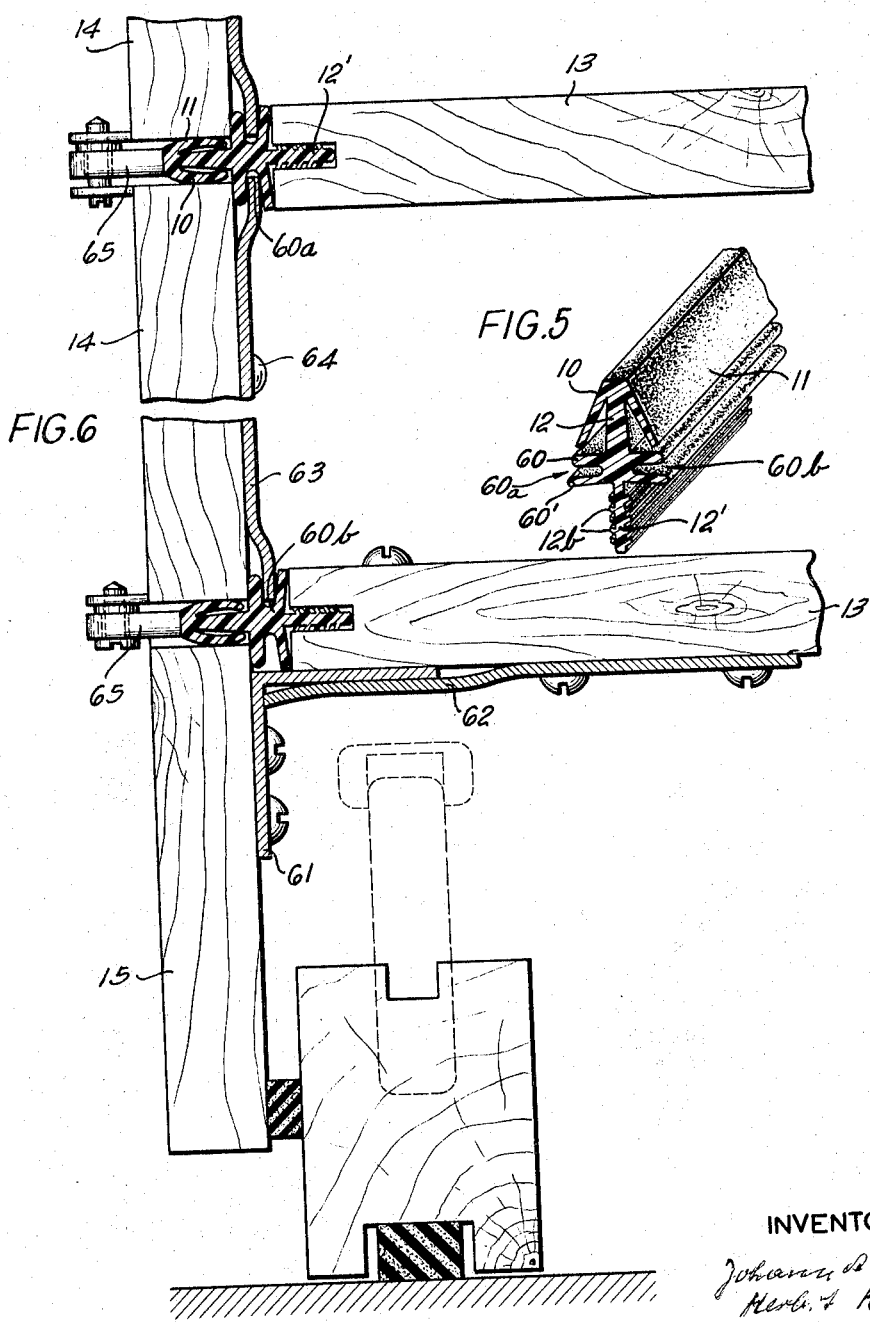

United States Patent Office 3,295,260
Patented Jan. 3, 1967

3,295,260
SEALING ELEMENT
Johann A. Bus, Holzli-Weiden, Switzerland, and Herbert Hirche, Stuttgart, Germany, assignors to Christian Holzapfel KG., Ebhausen, Wurttemberg, Germany
Filed Oct. 23, 1965, Ser. No. 503,246
Claims priority, application Germany, Feb. 26, 1962, H 40,652, June 9, 1962, H 41,718
10 Claims. (Cl. 49—489)

This is a continuation-in-part of an application entitled "Sealing Element," Serial No. 286,132, filed on June 4, 1963, and presently copending.

The present invention relates to sealing elements in general, and more particularly to a dust-proof, moth-proof, moisture-proof and sound-proof sealing element for use between relatively movable parts of furniture, doors and door frames, cabinets, closets, crates, boxes and similar structures. Still more specifically, the present invention also relates to sealing elements of the above-described type which simultaneously serve as a means for locking such parts against relative movement.

One object of the invention is to provide a simple and very inexpensive sealing element which can be mounted both on movable and stationary parts of structures such as set forth above, without requiring more than at most negligible changes in the construction and configuration of such parts.

A further object of the invention is to provide a sound-proof, dust-proof, moth-proof and moisture-proof sealing element which is equally useful to provide an effective seal between two movable parts, between a fixed part and a movable part, or between a fixed part and two or more movable parts.

It is yet a further object of the invention to provide a sealing element having the characteristics outlined above, which will be substantially concealed in actual use and which does not require precision fitting of the respective furniture parts in order to be able to carry out its assigned functions.

Still another object of the invention is to provide a sealing element which may serve to lock such parts against relative movement, when used with engaging means which engages the sealing means.

Finally, it is an object of the invention to provide a sealing element which, when in actual use, will be so interposed between the relatively movable parts as to prevent them from inflicting damage on one another, for instance if a door of a piece of furniture is carelessly "slammed" shut.

With the above objects in view, one feature of the present invention resides in the provision of a piece of furniture which comprises a first structural member having an elongated end portion and a sealing element which includes an elongated retaining portion secured to the first structural member and having an elongated carrier portion extending from the retaining portion and beyond the end portion of the first structural member. The sealing element is further provided with an elongated lip portion having an elongated edge portion connected with the carrier portion, the lip portion consisting of a material whose deformability exceeds the deformability of the material of the carrier portion. Finally, there is provided a second structural member having an elongated end portion and being movable with respect to the first structural member between a first position in which its own end portion is spaced from the lip portion of the sealing element, and a second position in which its own end portion engages and deforms the lip portion so that the element forms a seal between the end portions of the first and second structural members. Of course, one of these structural members may be a door or another type of closure which is movable with respect to the other structural member, or one of the members may be fixed and have the sealing element secured thereto while the other member may be movable relative to it. Also, the invention contemplates the provision of two members which are both movable, and of course the provision of one or more fixed members and one or more movable members which can be moved relative to the fixed members. The sealing element may be mounted on any of these members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective view of a sealing element embodying one form of the invention;

FIG. 2 is a transverse section through a piece of furniture, such as a cabinet, including two movable structural members and a fixed structural member which supports the sealing element, the structure being shown in closed position in which the end portion of the movable structural members engage and deform the lips of the sealing element;

FIG. 3 illustrates the structure of FIG. 2 in open position in which the end portions of the movable structural members are spaced from the respective lips;

FIG. 4 is a transverse section through a structure including a single movable structural member and in which the sealing element comprises a single lip;

FIG. 5 is a perspective view, partly in section, of another embodiment of the invention in which the sealing element forms also a part of a locking means; and FIG. 6 is a tranverse section through a cabinet-like structure which includes two movable structural members and incorporates the embodiment shown in FIG. 5, this embodiment serving to lock the movable members against movement relative to such fixed structural members as are also shown in the figure.

Referring now to the drawings, and firstly to FIG. 1, there is shown in this figure a sealing element comprising an elongated retaining portion 12' and an elongated carrier portion 12 having an elongated edge portion 12a which is integral with the adjacent edge portions 10a, 11a of a pair of elongated lips or flaps 10, 11. These lips consist of elastically deformable flexible material having the characteristics of rubber. The carrier portion 12 and the retaining portion 12' consist of a harder material, that is of a material which is at least more resistant to deformation than the material of the lips. The latter are disposed mirror-symmetrically at the opposite sides of the carrier portion 12. As shown, the lips diverge from the carrier portion 12 towards the retaining portion 12' of the sealing element so that each of the lips forms with the carrier portion a substantially V-shaped body. The thickness of each of the lips diminishes gradually in the direction towards its free edge portion, i.e. downwardly and away from the edge portions 10a, 11a as seen in FIG. 1. The retaining portion 12 extends beyond the free ends of the lips and is formed with external ribs 12b which facilitate anchoring the sealing element in a structural member. This is for example shown in FIGS. 2 and 3 where the respective structural members carrying the sealing element will be seen to be provided with elongated slots or grooves into which the retaining portion is forced, and wherein the retaining portion is frictionally retained by the rib 12b. In the embodiment shown in FIG. 1 the carrier portion 12 is integral with the lips 10, 11 and its thickness exceeds the thickness of the lips. This is done for the same reason as the provision of the carrier portion and retaining portion from a material more resistant to deformability than the lips 10, 11, namely to make these portions resistant to bending stresses. A median portion of the sealing element of FIG. 1 is formed with a longitudinally extending boss which defines two shoulders 12″ to serve as a means for determining the extent to which the retaining portion 12′ may be anchored in a structural member. This boss also serves to further stiffen the retaining element and enables the latter to offer greater resistance to stresses which tend to bend it in the direction to the left or to the right, relative to the showing in FIG. 1. It will be noted that the retaining portion 12′ is substantially coplanar with the carrier portion 12 so that the combined structure assumes the form of an elongated strip.

Turning now to FIGS. 2 and 3 there is shown therein a cabinet-like structure embodying the sealing element of FIG. 1. This structure comprises a fixed structural member 13 which constitutes a partition in a closet or in a cabinet and whose left-hand end portion 13′ extends in the longitudinal direction of the shoulders 12″. The retaining portion 12′ is anchored in a slot provided in the end portion 13′, as outlined earlier, so that the carrier portion 12 extends beyond and is spaced from the end face of the portion 13′. The additional structural members 14, 15 of the structure in FIGS. 2 and 3 constitute two doors, each of which is movable between the closed position of FIG. 2 and the open position of FIG. 3. When the doors 14, 15 are closed, the end faces of their end portions 14′, 15′ respectively engage and deform the lips 10, 11 in such a manner that the sealing element consisting of the carrier portion 12 and the lips 10, 11 forms an effective seal between the end portions 13′, 14′ and 15′. As soon as the doors 14, 15 move to or beyond the positions shown in FIG. 3, the lips 10, 11 will be freed from the deformation pressures and will return to their original undeformed positions. Contrary to the constructions known heretofore, the doors 14, 15 will be seen to be free from sealing strips, cords, fillets and similar sealing devices, since the lips 10, 11 and the carrier portion 12 together form a very effective sealing element which is noiseless and prevents entry of moisture, dirt and other foreign matter whenever the doors are closed and the lips 10, 11 are deformed. Of course, it will be understood that the retaining portion 12′ may be suitably anchored in the respective structural element by means other than, or in addition to, the elongated ribs, such as by use of an adhesive.

The material from which the entire sealing element is constituted may be of any desired type as long as it provides the required characteristics, namely ready deformability for the lips 10, 11 and a lesser deformability for the retaining portion 12′ and the carrier portion 12. It is also possible to constitute the portions 12 and 12′ from one material, and the lips 10, 11 from another, and to secure them together in a suitable manner along their common edge portions 10a, 11a and 12a. By way of example it is stated that such materials may include natural rubber, synthetic rubber, or any synthetic plastic material which exhibits the characteristics of rubber.

Turning now to FIG. 4 it will be seen that the sealing element of the present invention may be used also in pieces of furniture or other structures in which a single movable structural member is displaceable in its position relative to a fixed structural member. In such constructions one of the lips 10, 11 may be omitted and, if desired, the carrier portion 12 may be reinforced, for example by the addition of a strip of reinforcing material, so as to resist more definitely deformation when the remaining lip is flexed by the movable structural member. The single lip of the sealing element shown in FIG. 4 is designated with reference numeral 110 and is shown to be integral with a carrier portion 112. The portion 112 is mounted in a fixed structural member 100 in the manner explained earlier with reference to FIGS. 1–3, and the lip 110 may be engaged and deflected by the movable structural member 114. A strike plate, to which no reference numeral is assigned, is disposed intermediate the end face of the fixed structural member 100 and the inner side of the movable structural member 114 so as to prevent damage of one member by the other if the member 114 should be carelessly "slammed" to its closed position.

FIG. 5 illustrates yet another embodiment of the inventive sealing element. As will be seen there, the retaining portion 12′ with its elongated ribs 12b and the carrier portion 12 to which the lips 10, 11 are secured, are the same as in the preceding figures. The main difference between the embodiment of FIG. 5 and those of the preceding figures is that it can be used as part of a locking means for preventing opening of the cabinet or structure on which the sealing element finds use, and that it will simultaneously obviate the need for separate strike plates which are provided to protect opposing faces of relatively movable members. To this end, the embodiment of FIG. 5 is provided at the lower end of the carrier portion 12, that is adjacent the point at which the carrier portion and the retaining portion 12′ join, with a pair of spaced webs 60, 60′ which extend to both sides of the carrier portion 12 transversely thereto, and which define between themselves elongated grooves or channels 60a, 60b which are respectively located on opposite sides of the carrier portion 12.

FIG. 6 shows a structure incorporating the embodiment of FIG. 5. A pair of fixed structural members 13 are vertically spaced from one another, a fixed structural member 15 extends transversely to the member 13, and is suitably secured to a base which need not be further described. Upwardly of the fixed member 15 there are arranged a pair of vertically superimposed members 14 which are each movable with reference to the members 13 and 15 between positions in which they are closer to, and farther away from, the respective end faces of the members 13. Hinges 65 are provided to enable such movement. The lowermost member 13 is releasably but fixedly secured to the member 15 by means of a pair of interengaging members 61, 62 which are respectively secured to the members 15 and 13. Each of the members 13 is provided in its end face with a slot in which there is received the retaining portion 12′ of a sealing element as shown in FIG. 5. It will be seen that the webs 60, 60′ overlie the respective end faces of the members 13. It will also be noted that the webs 60, 60′ are of such a width as to cover completely the end faces of the members 13. Thereby, the webs 60, 60′ eliminate the need for a strike plate since they protect the end faces of the members 13 against damage should the members 14 be carelessly "slammed" into contact with them. Also, the spacing of the webs 60, 60′ acts as a cushion in such case, since the shock of such slamming will be diminished during transmission from web 60 to web 60′. The operation of the lips 10, 11 need not be further explained since it is identical with that in the preceding figures. They are shown in FIG. 6 as being deflected by the closed movable members 14.

As far as the locking feature of the embodiment of FIG. 5 is concerned, it will be seen that there is provided on the movable members 14 on FIG. 6 a locking element 63 which projects with its opposite ends into the grooves 60a, 60b of the vertically superposed sealing elements. This locking element 63 may be of various different types and constructions and it may be, as shown in FIG. 6, pivoted as at 64 so that it can be turned about the pivot axis by means of a suitable actuator, such as a handle, which is not shown, whereby the end portions of the locking means 63 will be selectively withdrawn from the grooves 60a, 60b or inserted thereinto. Of course, the locking means 63 could also be slidable in a vertical direction so as to be withdrawn from the grooves. In this case it would naturally engage only in the groove of one of the two sealing elements shown in FIG. 6.

Naturally, the embodiment of FIG. 5 need be provided with a groove defined between the webs 60, 60' on only one side of the carrier portion 12. For example, if the embodiment of FIG. 5 were to be utilized in a structure such as shown in FIG. 4, only one such groove would be necessary and the locking element 63 would then be carried by the movable member 114.

As has been pointed out in the introductory comments, the sealing element of the present invention is particularly useful as a seal between the parts between cabinets and the like, and the fact that the lips 10, 11 are so arranged that they must be deflected by the movable members compensates for any inaccuracies in machining and/or mounting of the structural members. In other words, even if the gap between the end portions of cooperating structural members varies, the lips will still engage the end portions at the adjacent members to form a satisfactory seal, as long as the variation does not exceed a given range which, it will be appreciated, can be quite liberal in view of the relation of the lips to the support portion.

It will be understood that each of the elements described above, or two or more together, may also find a useful application in other types of sealing elements differing from the types described above.

While the invention has been illustrated and described as embodied in a sealing element, it is not intended to be limited to the details shown, since various modifications and structural changes may be made without departing in any way from the spirit of the present invention.

What is claimed is:

1. In a structure of the character described, in combination, a fixed structural member having an elongated end portion; a sealing element including an elongated web fixed to said structural member and having an elongated carrier portion extending beyond and spaced from the said end portion, and a pair of elongated lips each consisting of elastic material which is softer than the material of said web and each of said lips having an elongated edge portion connected with the carrier portion of said web so that said web forms a rigid support for said lips, each of said lips forming with said web a substantially V-shaped body and said lips diverging from said web in a direction toward said end portion; and a pair of additional structural members each having an elongated end portion and each being movable with respect to said fixed member between a first position in which its end portion is spaced from one of said lips and a second position in which its end portion engages and deforms the respective lip so that said element forms a seal between the end portion of said fixed member and the end portions of said additional members.

2. In a structure of the character described, in combination, a first structural member having an elongated end face; a sealing element including an elongated retaining portion fixed to said first structural member and having an elongated carrier portion extending from said retaining portion and beyond said end face, an elongated lip having an elongated edge portion connected with said carrier portion, a pair of spaced parallel webs extending along said carrier portion transversely thereto and parallel to said end face of said first member, said webs forming between themselves a groove located on one side of the general plane of said carrier portion; a second structural member having an elongated end face and being movable with respect to said first structural member between a first position in which its end face is spaced from said lip, and a second position in which its end face engages and deforms said lip so that said element forms a seal between said end faces; and locking means provided on one of said structural members and adapted to selectively engage in said groove when said second structural member is in said second position so as to maintain the latter in said second position.

3. In a structure of the character described, in combination, a fixed structural member having an elongated end face; a sealing element including an elongated retaining portion fixed to said fixed structural member and having an elongated carrier portion extending from said retaining portion and beyond said end face, a pair of elongated lips each having an elongated edge portion connected with said carrier portion, a pair of spaced parallel webs extending along each side of said carrier portion transversely thereto and parallel to said end face of said first member, said webs forming between themselves a pair of grooves respectively located on opopsite sides of the general plane of said carrier portion; a pair of additional structural members each having an elongated end face and being movable with respect to said fixed structural member between a first position in which its end face is spaced from a respective one of said lips, and a second position in which its end face engages and deforms the respective lip so that said element forms a seal between said end faces of said additional structural members; and locking means provided on at least one of said structural members and adapted to selectively engage in said grooves when said additional structural members are in said second position so as to maintain said additional structural members in said second position.

4. A structure as defined in claim 3, wherein said sealing element consists of synthetic plastic material.

5. A structure as defined in claim 3, wherein said spaced parallel webs overlie said end face of said fixed structural member.

6. A structure as defined in claim 3, wherein said locking means comprises engaging means secured to respective ones of said additional structural members, and movable between a first position in which it is engaged in a respective groove and a second position in which it is withdrawn from such groove, said first and second positions respectively locking and unlocking said additional structural members with respect to movement relative to said fixed structural member.

7. A structure as defined in claim 3, wherein said retaining portion is provided with elongated ribs to facilitate anchoring of said sealing element in a supporting structure.

8. A structure as defined in claim 7, wherein said fixed structural element is provided with an elongated slot extending inwards of said end face thereof, and wherein said retaining portion is received in said slot and frictionally secured therewithin.

9. In a structure of the character described, in combination, a fixed structural member having an elongated end portion; a sealing element including an elongated web fixed to said structural member and having an elongated carrier portion extending beyond and spaced from said end portion, and a pair of elongated lips each consisting of elastic material which is softer than the material of said web and each of said lips having an elongated edge portion connected with the carrier portion of said web so that said web forms a rigid support for said lips, each of said lips forming with said web an acute angle so as to diverge from said web in direction toward said end portion; and a pair of additional structural members each having an elongated end portion and each adapted to be located in an engaging position in which its end portion engages and deforms the respective lip so that said element forms a seal between the end portion of said fixed structural member and the respective end portion of said additional structural members, and at least one of said pair of additional structural members being movable from said engaging position into a disengaged position spaced from the respective lip of said sealing element.

10. In a structure of the character described, in combination, a fixed structural member having an elongated end portion; a sealing element including an elongated web fixed to said structural member and having an elongated carrier portion extending beyond and spaced from said end portion, and at least one elongated lip consisting of elastic material which is softer than the material of said web and said lip having an elongated edge portion connected with the carrier portion of said web so that said web forms a rigid support for said lip, said lip forming with said web an acute angle so as to diverge from said web in a direction toward said end portion; and at least one additional structural member having an elongated end portion and adapted to be located in an engaging position in which its end portion engages and deforms said lip so that said element forms a seal between the end portion of said fixed structural member and the end portion of said additional structural member, said additional structural member being movable from said engaging position into a disengaged position spaced from said lip of said sealing element.

References Cited by the Examiner

UNITED STATES PATENTS

| | | | |
|---|---|---|---|
| 2,140,844 | 12/1938 | Mirus-Leuschner | 20—69 |
| 2,158,808 | 5/1939 | Wetzel | 20—69 X |
| 2,345,273 | 3/1944 | Macklanburg | 20—69 |
| 2,484,176 | 10/1949 | Lindemann | 20—69 X |
| 3,070,852 | 1/1963 | Hilliker | 20—69 X |
| 3,153,265 | 10/1964 | Hosea et al. | 20—69 |

FOREIGN PATENTS

| | | |
|---|---|---|
| 102,938 | 1/1938 | Australia. |
| 932,384 | 8/1955 | Germany. |
| 403,569 | 12/1933 | Great Britain. |
| 686,277 | 1/1953 | Great Britain. |
| 499,762 | 11/1954 | Italy. |

HARRISON R. MOSELEY, *Primary Examiner.*

REINALDO P. MACHADO, *Examiner.*

W. E. HEATON, *Assistant Examiner.*